United States Patent

Sri-Jayantha et al.

[11] Patent Number: 5,901,009
[45] Date of Patent: * May 4, 1999

[54] REDUCED SEEK ACOUSTIC NOISE DIRECT ACCESS STORAGE DEVICE

[75] Inventors: Muthuthamby Sri-Jayantha, Ossining; Arun Sharma, New Rochelle, both of N.Y.; Satoshi Yamamoto, Shiga-ken, Japan

[73] Assignee: International Business Machines Corporation, Armonk, N.Y.

[*] Notice: This patent is subject to a terminal disclaimer.

[21] Appl. No.: 08/455,806

[22] Filed: May 31, 1995

[51] Int. Cl.$^6$ ........................................................ G11B 5/55
[52] U.S. Cl. ...................................... 360/78.07; 360/78.04
[58] Field of Search ............................ 360/78.06, 78.07, 360/78.04, 78.09

[56] References Cited

U.S. PATENT DOCUMENTS

| | | | |
|---|---|---|---|
| 4,677,507 | 6/1987 | Elliott | 360/78.07 |
| 5,257,251 | 10/1993 | Chow et al. | 360/78.14 X |
| 5,309,299 | 5/1994 | Crossland et al. | 360/77.07 X |
| 5,392,174 | 2/1995 | Suzuki | 360/78.07 X |
| 5,465,034 | 11/1995 | Andrews, Jr. et al. | 360/78.06 X |

FOREIGN PATENT DOCUMENTS

62-267983  11/1987  Japan .

Primary Examiner—Aristotelis M. Psitos
Assistant Examiner—James L. Habermehl
Attorney, Agent, or Firm—McGinn & Gibb, P.C.

[57] ABSTRACT

A disk drive with reduced seek acoustic noise and a method for implementation, without any additional hardware or mechanical modifications to the actuator includes a filter such that servo-loop stability is unaffected. The filter is inserted outside the existing servo loop to reshape the existing velocity profile in real time and to facilitate the suppression of forcing components that produce seek acoustics. A weighting factor may be used to provide a weighted average of the filtered and unfiltered velocity reference signal to the servo loop so that at the end of a track seek operation, the unfiltered reference signal is applied to the velocity servo, and there is almost no change in settle-out performance when the target track is reached. It is not necessary to store large volumes of velocity profile data to deal with different seek lengths.

45 Claims, 8 Drawing Sheets

REDUCED SEEK ACOUSTIC NOISE DIRECT ACCESS STORAGE DEVICE

TECHNICAL FIELD

This invention relates to direct access storage devices wherein a head is positioned for interaction with a storage medium. More particularly, it relates to a direct access storage device (DASD) of this kind wherein acoustic noise generated as a result of rapid motion of the head-actuator assembly is markedly reduced and to a method for reducing such noise.

BACKGROUND ART

Actuator seek acoustic noise is a problem in small form-factor DASD's particularly in the lap-top computer environment as acoustic shielding materials can-not be easily deployed due to severe space, weight, heat dissipation, and cost constraints. The problem is acute in compact DASDs, as the physical dimensions of the actuator components are small, thus pushing the structural vibration modes into the acoustic range sensitive to the human ear. The problem rapidly becomes worse in high-performance files as the access times are pushed down drastically and more high frequency acoustic noise components are present.

Conventional DASD designs generally use a digital servo-control system to provide head motion for operations starting from any arbitrary position on the disk to the desired track where the data is read or written. The head movement includes a track-access phase where the head is accelerated to high velocities and moved over a relatively long distance prior to deceleration. The track-access phase requires large actuator forces which excite the structural resonant modes of the entire head-disk assembly (HDA) leading to high-pitched acoustic noise. During the track-access phase, the actuator servo-system follows a velocity profile, as is more fully explained with reference to FIG. 1.

Figure 1:
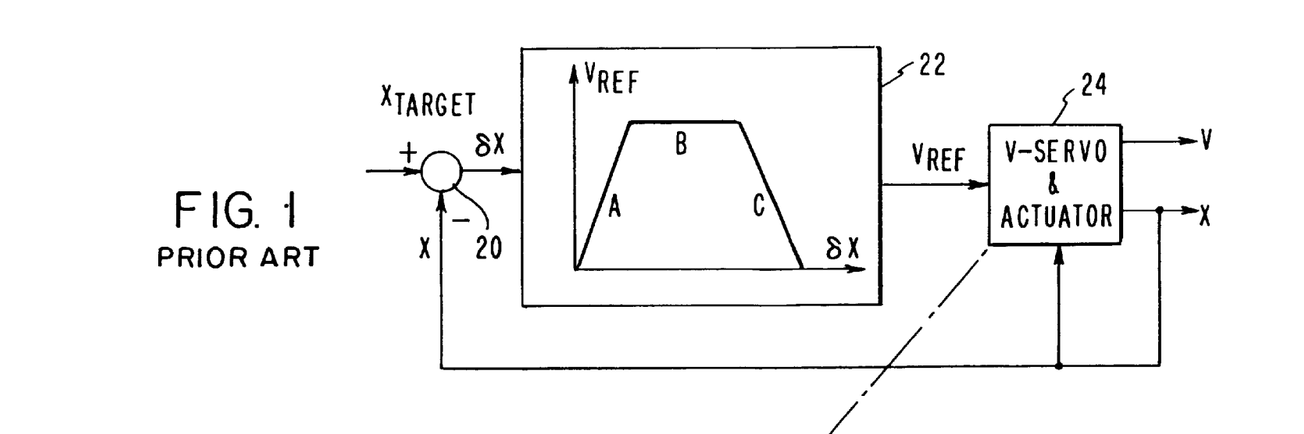
FIG. 1 is a block diagram of a conventional velocity servo.

In FIG. 1, a voltage (or a digital number) representative of the target track position is subtracted from a voltage (or a digital number) representative of present track position information at a node 20 to produce a tracks-to-go signal, The difference voltage is fed to a reference velocity generator 22 to produce a reference voltage for a velocity servo and actuator system 24. The application of the references voltage causes the actuator to move to a new position. A signal representative of position is fed back to block 24 and to junction 20 as noted above.

Figure 1A:
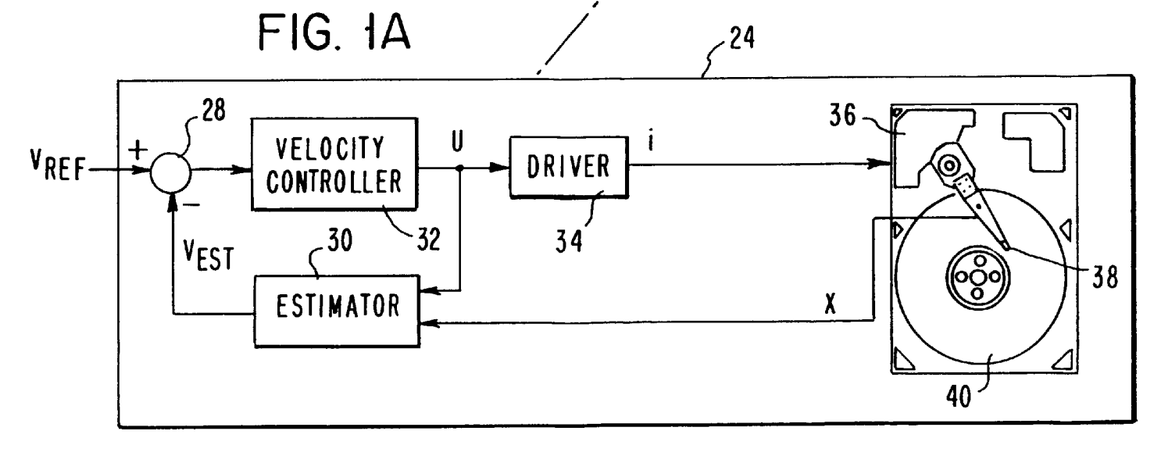
FIG. 1A is a block diagram of the velocity servo and actuator block of the conventional velocity servo of FIG. 1.

Referring to FIG. 1A, velocity servo and actuator system 24 includes a summing junction 28 for providing an output proportional to the difference between the reference voltage and the output voltage or a velocity estimator 30. The output of junction 28 is provided as an input to a velocity controller 32. The output of velocity controller 32 is provided as an input to estimator 30. Another input to estimator 30 is the position signal.

The output of velocity controller 32 is also provided as an input to a driver circuit 34 which provides a current output to a head position actuator 36 of sufficient magnitude and proportional to the voltage output of controller 32, so as to control the position of the head 38 as it interacts with the storage medium 40.

With more specific reference to FIG. 1, the target track is denoted by $X_{Target}$ and the actual head position and velocity are represented by X and V. The reference input to the velocity profile is shown as the tracks-to-go $\delta X$ which generates a reference velocity $V_{Ref}$ for the velocity servo.

The velocity profile is generally stored as a look-up table in the control processor memory. The velocity profile in general consists of an acceleration phase (A), a constant velocity phase (B) and a deceleration phase (C) as a function of the distance to the target track. Some DASDs do not have a servoed acceleration phase A, where phase B extends to the beginning of seek. (In mid-range products the velocity profile is generated by the microprocessor in real-time by storing the desired set of deceleration parameters.) A typical velocity profile of a low-end DASD with an attempt to reduce "jerk" is also shown in FIG. 1. As can be seen, there are still abrupt discontinuities between phases A, B and C leading to rapid changes in the acceleration/deceleration current at the transition points. This translates into abrupt changes in the driving force for the actuator. The resulting jerks (i.e., time rate of change in acceleration/deceleration) can excite and cause a ringing of the actuator/HDA mechanical resonant modes which may cause acoustic noise. Measurements obtained in 2.5 inch diameter disk drives suitable for portable applications have shown strong correlation between rate-of-change of current and acoustic peaking.

An obvious solution to this problem is to insert a bank of filters, such as, for example, low pass filters between the control processor and the power driver which drives the actuator. This has the effect of reducing the high frequency jerk components in the control command (U, in FIG. 1A) which drives the actuator by means of current from driver 34. However, the filter introduces a significant phase-lag in the control loop. This leads to a loss of phase margin which is a critical parameter of the servo-system and may reduce the stability of the control loop leading to increased actuator settle-out and track misregistration (TMR) problems caused by excessive vibration. Use of notch filters to suppress potential resonance-based acoustic components only partially solves the problem with a cost penalty as well as some phase lag.

Reduction in velocity servo gain is another method that would reduce rate of change of current, but would compromise settle-out. Adding a real or simulated inductance, to a voltage mode driver can potentially improve the acoustic condition. The look-up velocity profile can also be reshaped to "soften" the transitions, but the difficulty with this approach is that excessive storage is required to generate such a profile for the complete range of seek lengths, i.e., from short seeks to long seeks. Further, the software overhead to look ahead for the transition points cannot be predicted efficiently in the time domain for different actuator seek lengths (particularly for those of short seeks). This approach would essentially require the storage of a very large number of individual velocity profiles for different seek lengths.

SUMMARY OF THE INVENTION

In accordance with the invention a novel apparatus and method are used to overcome the limitations of the above approaches. Advantage is taken of the fact that the velocity profile is sampled at each sector of the rotating disk during the track-access (seek) mode. This is equivalent to a time domain signal at the processor sampling rate. Hence this signal can be digitally filtered using a first or second order low-pass filter. The filter "smooths" the abrupt transitions of the profile and thus the commanded velocity. This reduces the excitation of the actuator structure and its associated acoustic ringing. At the same time, the filter is not introduced into the closed loop servo system, but is outside the loop, thus preserving the phase-margin. By setting an appropriate initial condition, the filter transient characteristics could be further optimized.

In accordance with the invention, the $V_{Ref}$ corresponding to δX is input through the smoothing filter from the start of the seek. The output of the velocity profile filter, $V_{Ref_{Filtered}}$, is the "new" target velocity that is presented to the velocity servo. During acceleration and constant velocity phase, the only additional computation required is that of a first or second order digital filter. The digital filtering operation alone during phase-A and -B elegantly reduces the acoustic problem. However, the newly generated filtered profile produces settle-out concern because of the distortion of the original deceleration profile. To eliminate the divergence between the $V_{Ref}$ and $V_{Ref_{Filtered}}$ a gradually changing weighted average of the form $V_{Ref_{Composite}} = \alpha V_{Ref} + (1-\alpha) V_{Ref_{Filtered}}$ is introduced as the target velocity during the deceleration phase-C. The weighting coefficient α can be continuously reduced from 1 to 0 as the tracks-to-go approaches a predetermined threshold number (e.g., 10% of the deceleration length). If computation of α is not desirable, then it can be proportionally decreased as 1, 0.75, 0.5, 0.25, and 0 as the target track value is progressively reduced to the threshold value. This is done so that the servo system reverts to the original profile, thus leaving the settle-out optimization unaffected by the filter. Multiple velocity profiles do not have to be stored for different seek lengths as the filter automatically acts in the time domain for every profile transition or discontinuity and works equally well for short seeks.

BRIEF DESCRIPTION OF THE DRAWINGS

FIG. 3b is a graph of current and actuator velocity as a function of time for a seek operation across one third of the total seek length using the profile of FIG. 3a.

FIG. 4b is a graph of current-and actuator velocity as a function of time for a seek operation across one third of the total seek length using the profile of FIG. 4a.

FIG. 5b is a graph of current and original, filtered, and composite velocity as a function of time for the operation of FIG. 5a.

FIG. 5c is a graph of the time derivative of actuator current in the operation of

FIG. 5a.

FIG. 7b is a graph of amplitude of an ATF produced by the apparatus of FIG. 7a.

FIG. 7c is a graph of phase of an ATF produced by the apparatus of FIG. 7a.

DETAILED DESCRIPTION OF PREFERRED EMBODIMENTS

Figure 2:
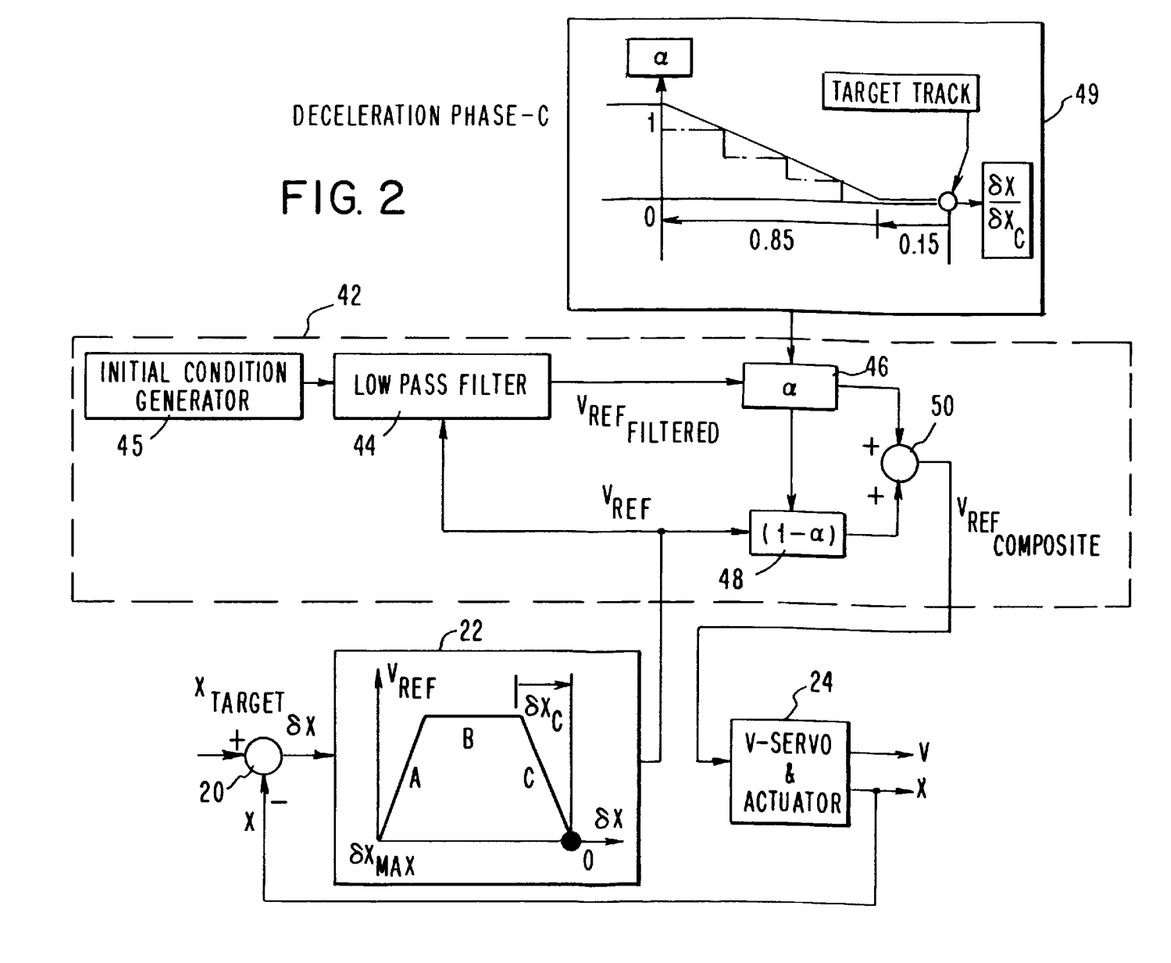
FIG. 2 is a block diagram of a velocity servo in accordance with the invention.

Referring to FIG. 2, the output of reference generator 22 is not connected directly to velocity servo and actuator system 24. Instead the output is connected to a filter network 42. Within network 42 the reference voltage is provided to the input of a low pass filter 44. The initial conditions for low pass filter 44 are provided by an initial condition generator 45. The selected or programmed initial conditions are an indirect control of acceleration current at the start or a seek operation.

The output of low pass filter 44 is provided to a controllable voltage divider 46 which reduces the amplitude of the output signal by a factor α, where α is less than 1.

The reference voltage output is also supplied to a controllable voltage divider 48 which multiplies the output by a factor of 1–α. In other words, divider 46 and divider 48 are linked together so that the sum of the two multiplication factors is always equal to 1. The outputs of divider 46 and divider 48 are summed at a node 50. The sum, which is a composite reference signal (a weighted average) is connected to the input of velocity servo and actuator system 24.

In accordance with the invention, the value for α is not fixed but may be changed during the deceleration Phase-C. A weighting factor generator 49 determines the value of α. Generator 49 may be a look up table, or it may be another appropriate function with decreasing value such as the linearly decreasing function of FIG. 2.

More specifically, as shown in FIG. 2, $V_{Ref}$ is the time domain signal corresponding to the conventional target velocity. This sampled data is passed through a digital filter. Towards the end of the seek, for example 85% along the way in the deceleration phase, the unfiltered target velocity $V_{Ref}$ is gradually merged through the weighted average function described above with the filtered velocity signal so that any jerk due to the deceleration switching (from acceleration or constant velocity) process is suppressed as outlined above.

Figure 3A:
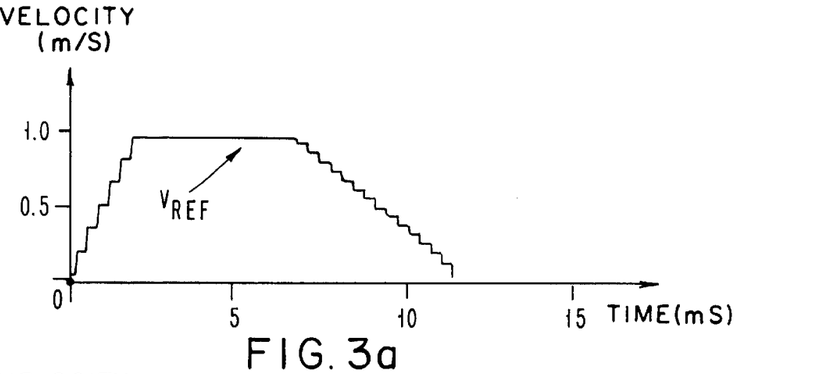
FIG. 3a is a graph of a conventional stored velocity profile as a function of time.
Figure 3B:
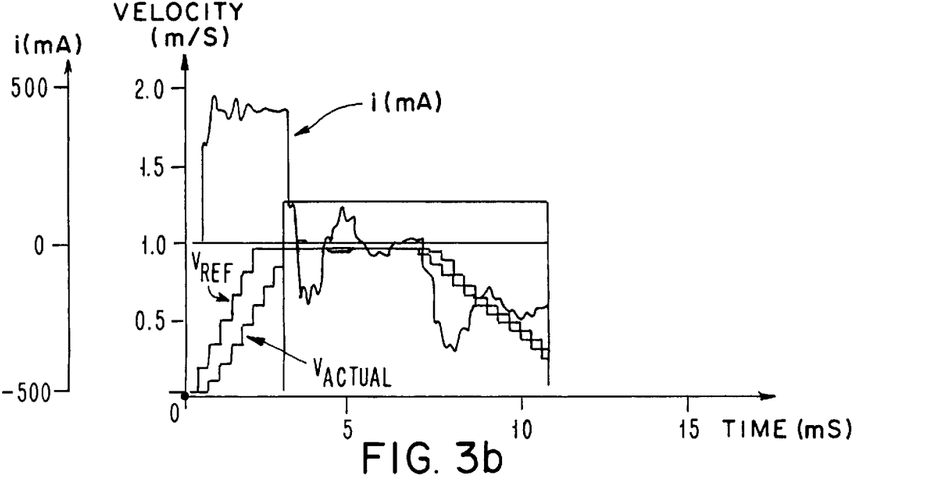
Figure 3C:
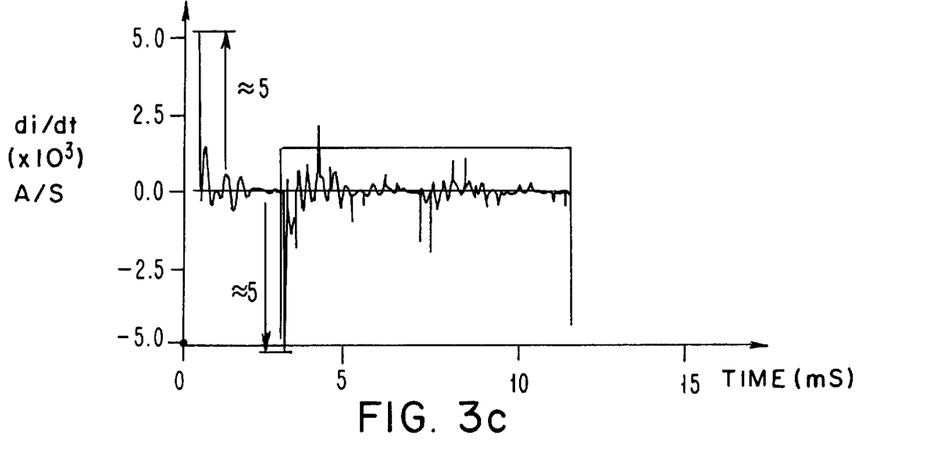
FIG. 3c is a graph of the time derivative of the actuator current of FIG. 3b.
Figure 4A:
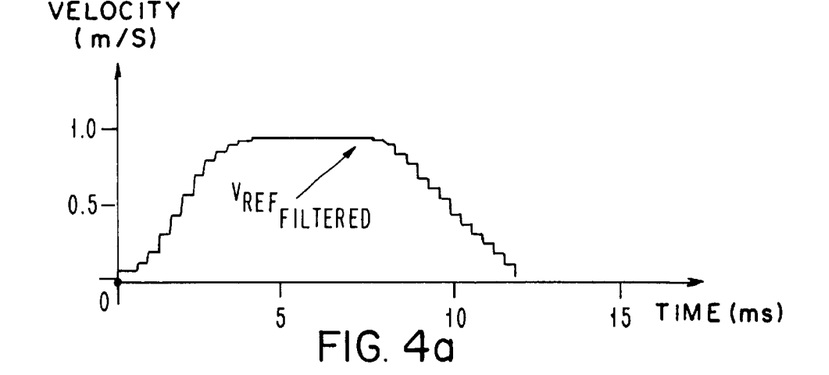
FIG. 4a is a graph of the velocity profile, similar to that of FIG. 3a, but filtered in accordance with the invention.
Figure 4B:
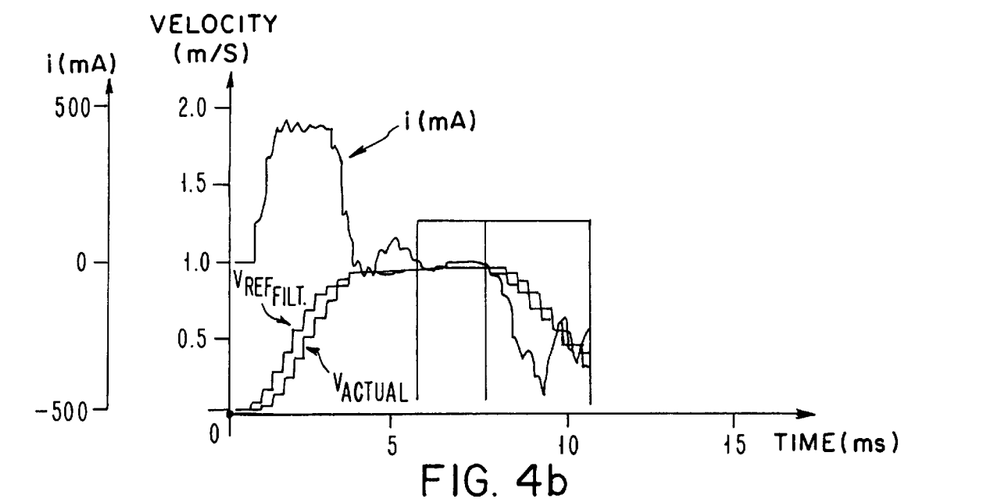
Figure 4C:
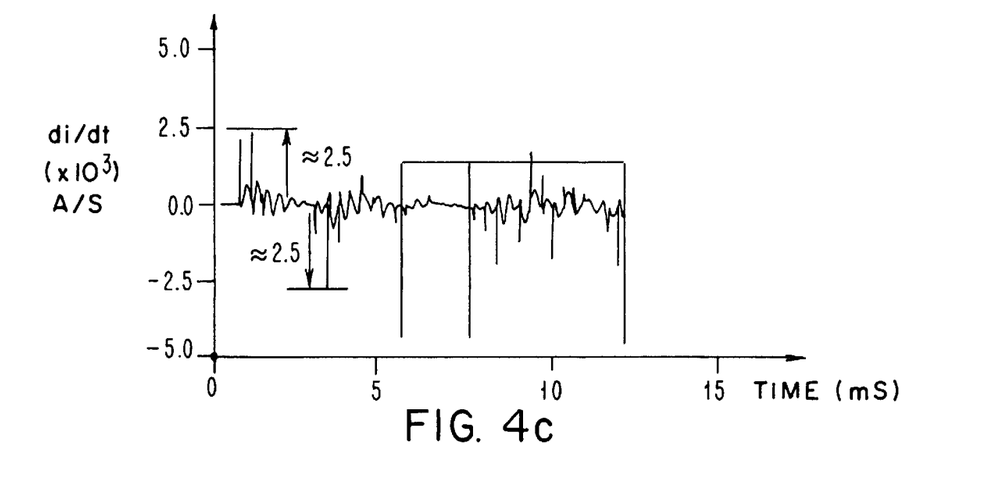
FIG. 4c is a graph of the time derivative of the actuator current of FIG. 4b.

The above approach was applied to the simulation or the servo system of a 3.5 inch form factor disk drive used in a desk top system. The results are shown in FIG. 3 and FIG. 4 for a seek operation over one third of the radius of the disk. FIG. 3 shows the conventional velocity servo scheme without any acoustic noise reduction. FIG. 4 shows the novel acoustic noise suppression scheme with velocity profile filtering in accordance with the invention. FIG. 3a shows the unfiltered velocity profile $V_{Ref}$ plotted against time showing the acceleration, constant velocity, and deceleration phases. FIG. 4a shows the corresponding digitally filtered target velocity. FIG. 3b shows the reference velocity, the estimated actuator velocity, and the actuator current. As can be seen, the current waveform has high slopes and abrupt transitions. FIG. 4b shows the corresponding digitally filtered desired velocity, the estimated velocity and the current. It can be seen that the slopes and the "corners" of the current waveform have been smoothed out in this case. FIG. 3c shows the derivative of the current waveform which is an approximate measure of the acoustic noise for the conventional case with no acoustic noise suppression. It can be seen that sharp peaks with large amplitudes exist showing the source for large acoustic noise levels. FIG. 4c shows the corresponding derivative of the current for the noise suppression scheme.

Figure 5A:
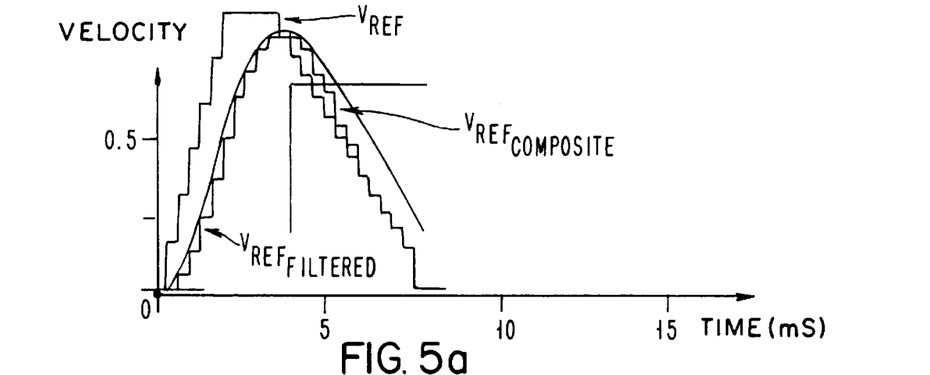
FIG. 5a is a graph of original, filtered, and composite velocity profile, as a function of time for a seek operation across one sixth of the total seek length.
Figure 5B:
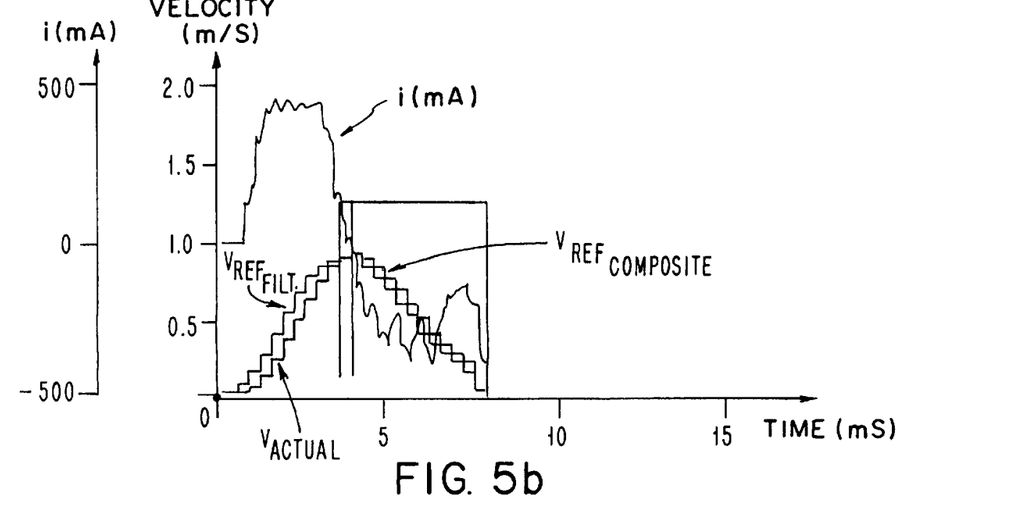
Figure 5C:
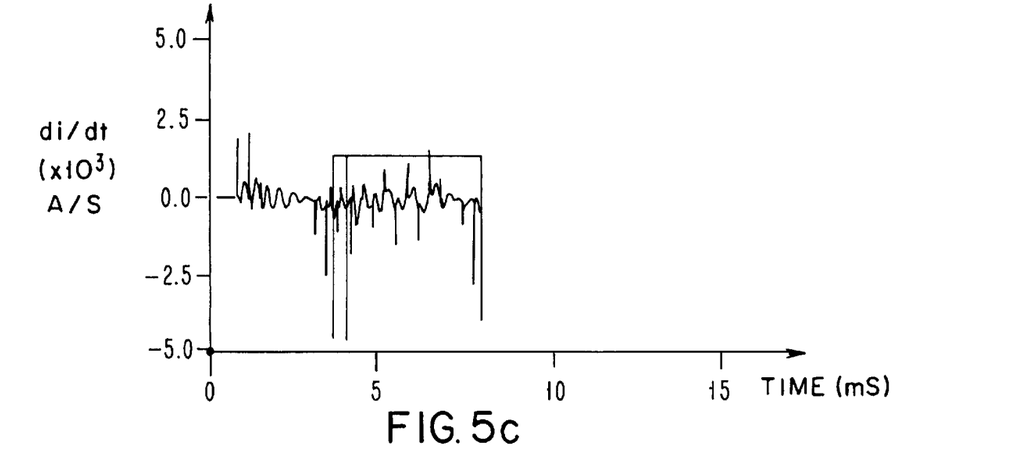

It can be seen that the peaks of the waveforms have been reduced by about 50% compared to the conventional case which shows a relatively low derivative of actuator current. FIG. 5a, FIG. 5b and FIG. 5c are similar to their FIG. 4 counter-parts but show a short seek (⅙th total seek length) where the constant velocity phase B is not reached prior to entering the deceleration phase. The original velocity profile, the digitally filtered velocity profile, and the composite velocity profile $V_{Ref_{Composite}}$ are all shown in FIG. 5a, where the filtered profile is merged with the unfiltered profile using a progressively weighted average method as described above.

Figure 6:
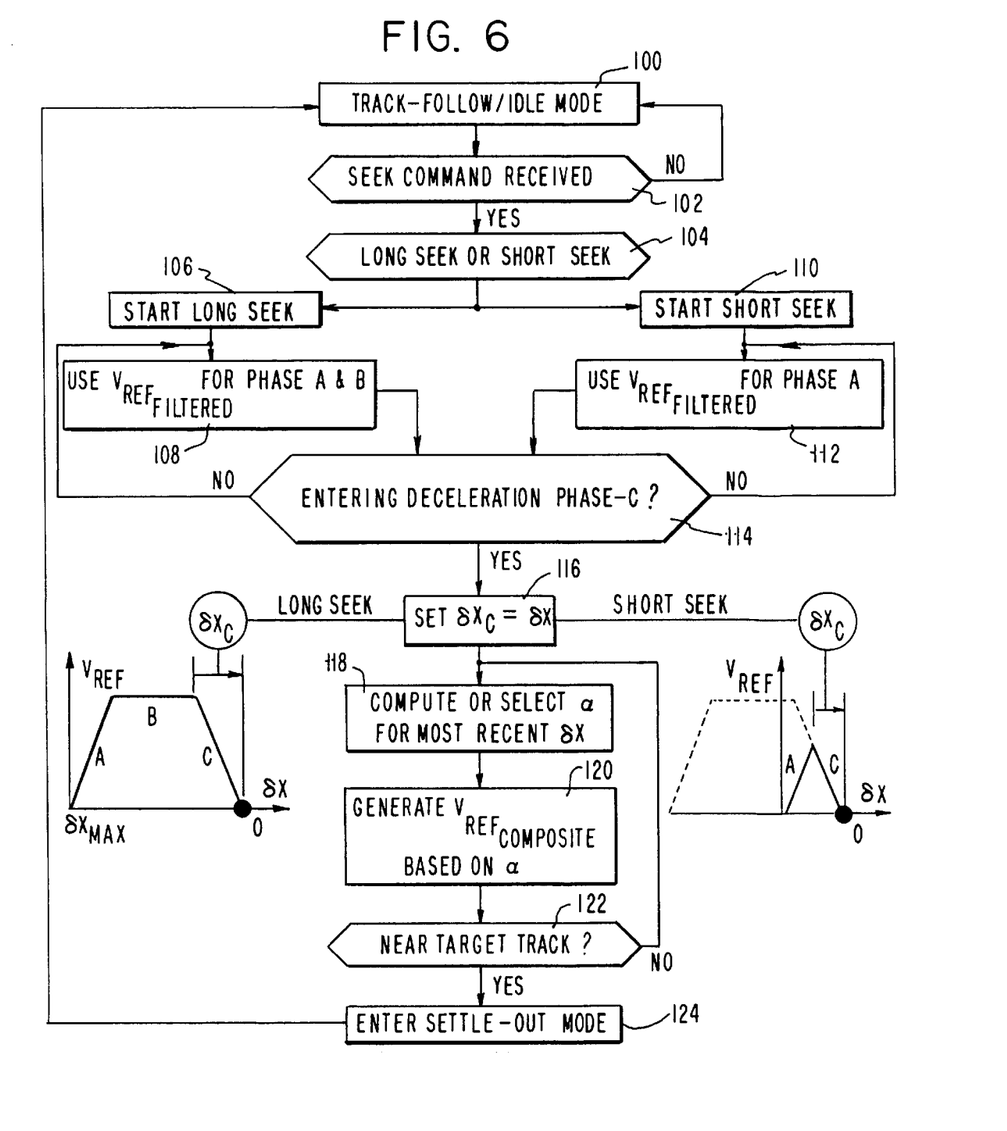
FIG. 6 is a flow chart for a program which may be used to implement the invention.

FIG. 6 is a flow chart for implementation of the invention. It is important to distinguish the implementation for seeks with and without constant velocity phase B. Under power on condition, a disk drive is either in track-following mode or in a power saving idle mode as shown by block 100. When a seek command is received at block 102, the disk drive enters the seek mode at block 104. The program will follow two possible paths based on the seek length commanded. A seek velocity profile having three phases, namely A, B, and C, is referred to as a long seek which includes the constant velocity phase B. On the other hand a velocity profile that utilizes only phases A and B is referred to as short seek. For a long seek, branching is to block 106 and then block 108 where the filtered reference velocity is computed throughout phases A and B, and the velocity servo is used to maintain the filtered reference velocity. When phase C is reached (determined at block 114) the reference velocity profile is then used to generate the composite reference velocity. For a short seek, branching is to block 110 and then to block 112 where the filtered reference velocity is computed for phase A up until phase C is entered, as determined at block 114. It is noted that for a short seek, the constant velocity phase B is never realized since the target track is reached without having to reach higher velocities.

As previously described, following block 114 the composite reference velocity is generated from the stored reference velocity. An important part of the composite velocity computation are the steps required to compute the weighting parameter α as shown in blocks 116 and 118. The composite reference velocity generated in block 120 is followed by the seek velocity servo until the vicinity of the target track is reached as determined at block 122. The deceleration phase C is sustained by looping through blocks 118, 120, and 122 until the settleout phase is entered at block 124.

Conventionally when the read/write element is about 1 to 0.5 track pitch distance away from the target track, the settle-out mode is entered. Once in the settleout mode, use of the present invention is generally no longer necessary, because no reference velocity or velocity servo is employed.

When the read/write element reaches the target track, the track-follow mode is initiated as shown by the program looping back to block 100. The process of idle, track-follow, seek, settleout, track-follow and idle is repeated as many times as the seek operation is requested by the host computer. A 2.5" form factor disk drive 130 is tested for acoustic performance with the instrumentation shown in FIG. 7a. The goal is to capture the difficult-to-model acoustic characteristics by directly measuring the cause and effect. Disk drive 130 is controlled by an external servo tester 132 which selects a particular seek characteristic to be executed by the disk drive. The current flow "i" in the voice coil motor VCM of disk drive 130 that causes the acoustics is monitored by a current-probe 134 that is inductively coupled to a loop 136 in the VCM circuit. The output of current probe 134 is provided to the input of a current probe amplifier 138. The amplified current output signal is provided as an input to an acoustic frequency range spectrum analyzer 140, such as a Hewlett Packard 3562A. This amplified current signal is also provided to a digital sampling oscilloscope 142 which takes and displays data in the time domain.

Figure 7A:
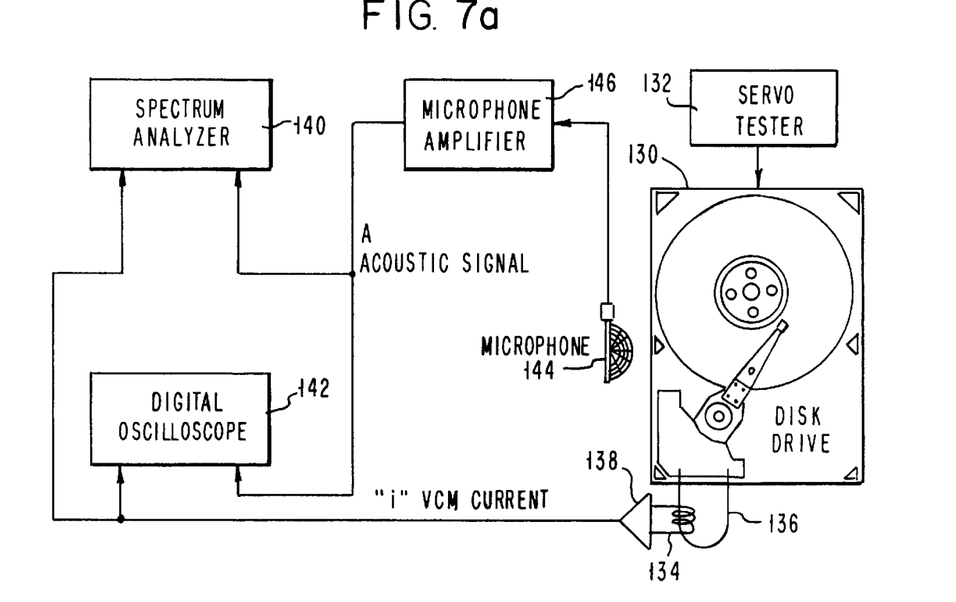
FIG. 7a is a block diagram of instrumentation used to determine an acoustic transfer function (ATF) of a disk drive.

A microphone 144 is placed in proximity to the VCM of disk drive 130 in order to pick up a representative acoustic signal denoted by "A". The output of microphone 144 is supplied to a microphone amplifier 146 to provide an amplified acoustic signal A. This acoustic signal is also supplied as an input to spectrum analyzer 140 and oscilloscope 142. The ratio of the acoustic signal "A" to VCM current "i" as measured in the frequency domain is referred to as acoustic transfer function (ATF). The identical signals are also measured in time-domain. The magnitude and phase of the ATF are also shown are FIG. 7b and FIG. 7c, respectively, while the disk drive is commanded to execute multiple seek operations. The ATF of FIGS. 7b and 7c appears equivalent to that of a "derivative" operation from 100 Hz to 1000 Hz (i.e., 20 dB/decade slope in magnitude and 90 degree lead in phase). Beyond 2000 Hz it behaves as an over damped second-order system in cascade with the derivative operation. A mild resonance at approximately 2 kHz is observable despite the use of analog notch filters in the servo-loop of the disk drive.

Figure 7B:
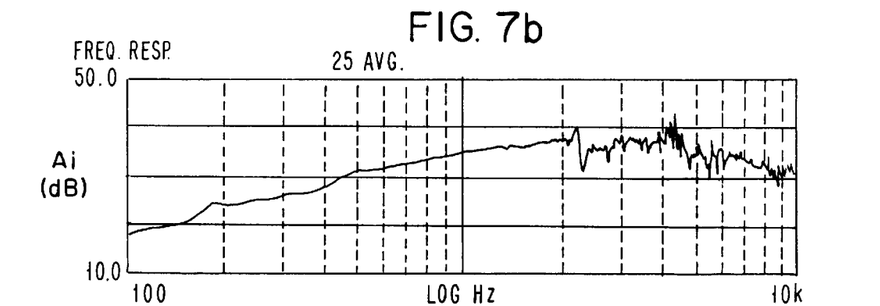
Figure 7C:
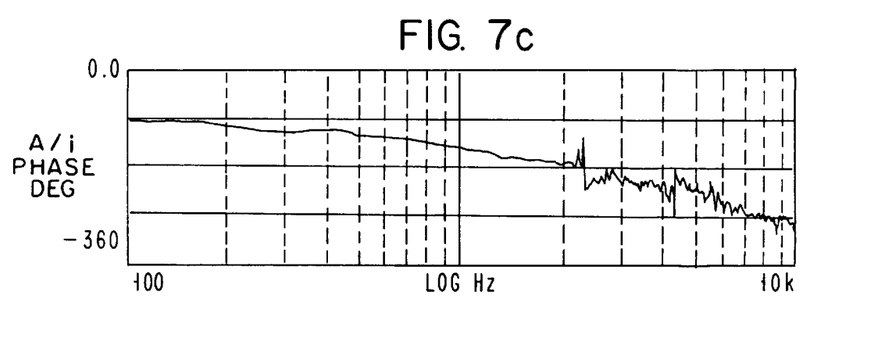
Figure 8:
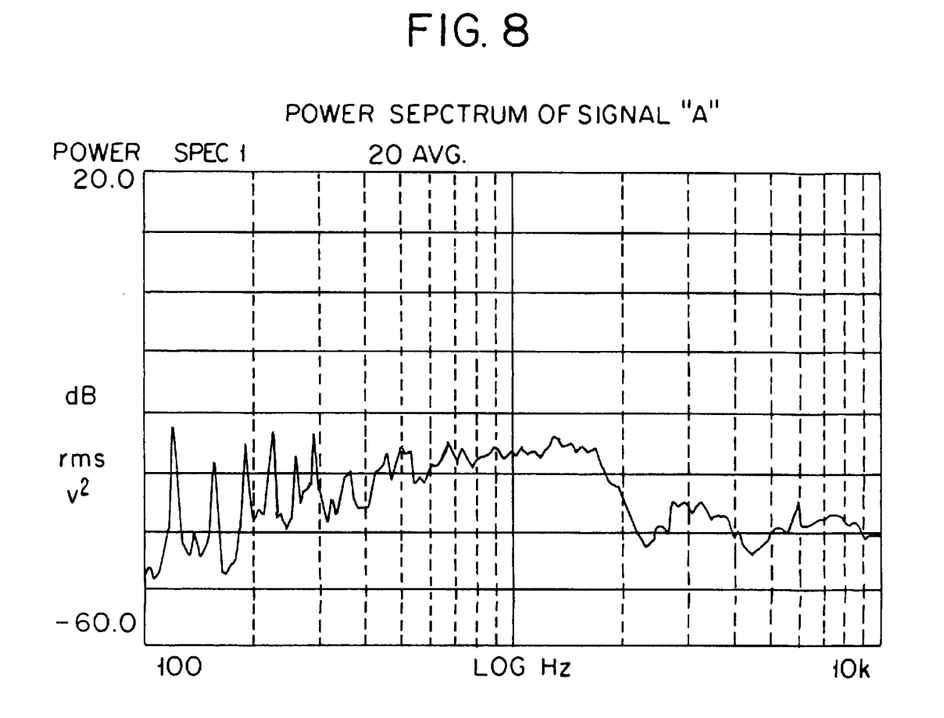
FIG. 8 is an acoustic power spectrum or a disk drive which produced the ATF of FIG. 7b and FIG. 7c.

FIG. 8 shows the power spectrum of the acoustic signal A. The mild resonance observed in FIG. 7b is however not significant in the generation of acoustics in this case.

I will be recognized by one skilled in the art that the characteristics of the filter used to smooth the reference voltage waveform from reference voltage generator 22 may be optimized for a particular disk drive. For example, low pass filters having cut off frequencies of 100 Hz or 200 Hz may be tried. The instrumentation of FIG. 7a provides a quick and convenient system for experimentally verifying the results of a selected design. It will also be recognized by one skilled in the art, that the present invention may be implemented through suitable programming of the microcode that controls the microprocessor of the servo system of the disk drive. The flow chart of FIG. 6 can be readily programmed to perform these functions.

With respect to the filter, for the disk drives utilized, a second order filter has been found to produce the best compromise in performance, complexity and flexibility. The equations which govern the design for an analog version of the filter are set forth below. However, it will be recognized that a digital filter can be implemented in the microcode which runs the microprocessor, as discussed above. The equations governing a digital version of the filter are also set forth below.

Analog Version $$\frac{Y}{X} = \frac{\omega_n^2}{s^2 + 2\zeta\omega_n s + \omega_n^2}$$

where $f$=filter corner frequency (Hz), $\omega_n = 2\pi f$, and $\zeta$=filter damping ratio.

Digital Version $Y_n = -a_1 Y_{n-1} + b_1 X_{n-1} + b_2 X_{n-2}$ where $$p = \frac{\text{filter corner frequency (Hz)}}{\text{sector-sampling frequency (Hz)}},$$
$$q = 2\pi p,$$
$$d = 1 + (2\zeta q) + (q^2),$$
$$a_1 = \frac{q^2}{d},$$
$$b_1 = \frac{(2\zeta q) + 2}{d}, \text{ and}$$
$$b_2 = \frac{1}{d}.$$

Various modifications of the invention will be apparent to those skilled in the art. The invention is directed to all such modifications which are within the scope of the claims.

What is claimed is:

1. A direct access storage device comprising:
   a head for interaction with a storage medium;
   an actuator for moving the head; and
   a servo system including a velocity servo loop for operating the actuator in response to a reference signal, said reference signal varying as a function of time, said reference signal comprising an arbitrary signal having an arbitrary, asymmetrical velocity trajectory,
   filter means for real time filtering of the reference signal outside the velocity servo loop to produce a filtered reference signal, said filtered reference signal having less abrupt changes than said reference signal whereby abrupt transients in the signal applied to the actuator are reduced in magnitude.

2. The direct access storage device of claim 1 wherein said filter is configured to reduce acoustic noise produced by said actuator, when said actuator moves said head.

3. The direct access storage device of claim 1 wherein a combination of said reference signal and said filtered reference signal is used to control said servo system.

4. The direct access storage device of claim 3 wherein said combination comprises a weighted average.

5. The direct access storage device of claim 4 wherein said weighted average is dependent on the number of tracks remaining to the target track.

6. The direct access storage device of claim 3 wherein said combination is used to control said servo system when said servo system is in a deceleration mode.

7. The direct access storage device of claim 6, wherein said combination comprises a weighted average.

8. The direct access storage device of claim 1 further comprising means for dynamically changing characteristics of the filter means as a function of time.

9. The direct access storage device of claim 1 further comprising means for changing initial characteristics of the filter means.

10. The direct access storage device of claim 1 wherein said filter means comprises a digital filter.

11. The direct access storage device of claim 1, wherein an output of said filter means is asymmetric.

12. The direct access storage device of claim 1, wherein said reference signal comprises an existing reference velocity representing a number of tracks-to-go for said head in traversing said storage medium.

13. The direct access storage device of claim 1, wherein said filter means is positioned outside of said velocity servo loop, said servo system comprising a closed velocity servo loop, and
   wherein said reference signal comprises an existing reference velocity representing a number of tracks-to-go for said head in traversing said storage medium.

14. The direct access storage device of claim 1, wherein said reference signal comprises an existing reference velocity signal and said filtered reference signal produced by said filter means comprises a modified, composite velocity signal.

15. The direct access storage device of claim 1, wherein said reference signal comprises an existing reference velocity signal.

16. The direct access storage device of claim 1, wherein said filter means comprises one of a first order filter and a second order filter.

17. The direct access storage device of claim 1, wherein said filtered reference signal produced by said filter means is kinematically unrelated to the reference signal input to said filter means.

18. The direct access storage device of claim 1, wherein said filter means employs said velocity servo loop such that a velocity reference signal in relation to a distance from the target track is found using a velocity profile, and
   wherein a calculation of said velocity reference signal does not rely on a seek time of said head.

19. The direct access storage device of claim 1, wherein said filter means removes a predetermined change of velocity of said head at transition points occurring at at least one of an interface between an acceleration phase and a constant velocity phase of said head and an interface between said constant velocity phase and a deceleration phase of said head.

20. The direct access storage device of claim 1, wherein said filter means smooths an original velocity profile of said head output in the time domain.

21. The direct access storage device of claim 1, wherein said reference signal corresponds to an original velocity profile signal of the head in the time domain, and said filter means merges said original velocity profile signal in the time domain with the filtered reference signal using a weighted average, and
   wherein said filtered reference signal is obtained from the original reference signal itself.

22. The direct access storage device of claim 1, wherein said storage medium includes a plurality of tracks and is rotatable, and
   wherein a velocity profile of the head is sampled at each sector of the rotating medium during a track-access mode.

23. The method of claim 1, wherein said step of filtering includes removing a predetermined change of velocity of said head at transition points occurring at at least one of an interface between an acceleration phase and a constant velocity phase of said head and an interface between said constant velocity phase and a deceleration phase of said head.

24. The direct access storage device of claim 1, wherein said step of filtering includes smoothing an original velocity profile of said head output in the time domain.

25. The method of claim 1, wherein said storage medium includes a plurality of tracks and is rotatable,
   further comprising a step of sampling a velocity profile of the head at each sector of the rotating medium during a track-access mode, to provide a reference signal for filtering.

26. A method for operating a direct access storage device having a head for interaction with a storage medium, an actuator for moving the head, and a servo system including a velocity servo loop for operating the actuator in response to a reference signal, said reference signal varying as a function of time, comprising:

filtering in real time the reference signal outside the velocity servo loop to produce a filtered reference signal, said reference signal comprising an arbitrary signal having an arbitrary, asymmetrical velocity trajectory; and supplying said filtered reference signal to the velocity servo loop.

27. The method of claim 26 wherein the filtered reference signal has less abrupt changes than said reference signal whereby abrupt transients in the signal applied to the actuator are reduced in magnitude.

28. The method of claim 26 further comprising configuring a filter to produce said filtered reference signal so that acoustic noise produced by said actuator when said actuator moves said head is reduced.

29. The method of claim 28 further comprising dynamically changing characteristics of the filter as a function of time.

30. The method of claim 28 further comprising setting initial characteristics of the filter.

31. The method of claim 26 further comprising using a combination of said reference signal and said filtered reference signal to control said servo system.

32. The method of claim 31 wherein said combination comprises a weighted average.

33. The method of claim 32 further comprising selecting said weighted average as a function of the number of tracks remaining to a target track.

34. The method of claim 31 further comprising using said combination to control said servo system when it is in a deceleration mode.

35. The method of claim 34 wherein said combination comprises a weighted average.

36. The method of claim 26, wherein said filtered reference signal is asymmetric.

37. The method of claim 26, wherein said reference signal comprises an existing reference velocity representing a number of tracks-to-go for said head in traversing said storage medium.

38. The method of claim 26, wherein said step of filtering includes filtering by a filter positioned outside of said velocity servo loop, said servo system comprising a closed velocity servo loop, and wherein said reference signal comprises an existing reference velocity representing a number of tracks-to-go for said head in traversing said storage medium.

39. The method of claim 26, wherein said reference signal comprises an existing reference velocity signal and said filtered reference signal produced by said filter step comprises a modified, composite velocity signal.

40. The method of claim 26, wherein said reference signal comprises an existing reference velocity signal.

41. The method of claim 26, wherein said step of filtering includes filtering by one of a first order filter and a second order filter.

42. The method of claim 26, wherein said filtered reference signal produced is kinematically unrelated to the reference signal.

43. The method of claim 26, wherein said step of filtering includes employing said velocity servo loop such that a velocity reference signal in relation to a distance from the target track is found using a velocity profile, and wherein a calculation of said velocity reference signal does not rely on a seek time of said head.

44. The method of claim 26, wherein said reference signal corresponds to an original velocity profile signal of the head in the time domain, and said step of filtering includes merging said original velocity profile signal in the time domain with the filtered reference signal using a weighted average, and wherein said filtered reference signal is obtained from the original reference signal itself.

45. A direct access storage device comprising:

a head for interaction with a storage medium;

an actuator for moving the head; and a servo system including a velocity servo loop for operating the actuator in response to a reference signal, said reference signal varying as a function of time and comprising an arbitrary signal having an arbitrary, asymmetrical velocity trajectory, a filter for real time filtering of the reference signal outside the velocity servo loop to produce a filtered reference signal, said filtered reference signal having less abrupt changes than said reference signal whereby predetermined transients in the signal applied to the actuator are reduced in magnitude.

* * * * *